May 14, 1963 C. G. WEIGAND 3,089,193
APPARATUS FOR AND METHODS OF ASSEMBLING RECORD ENGAGING STYLI
Filed July 16, 1958
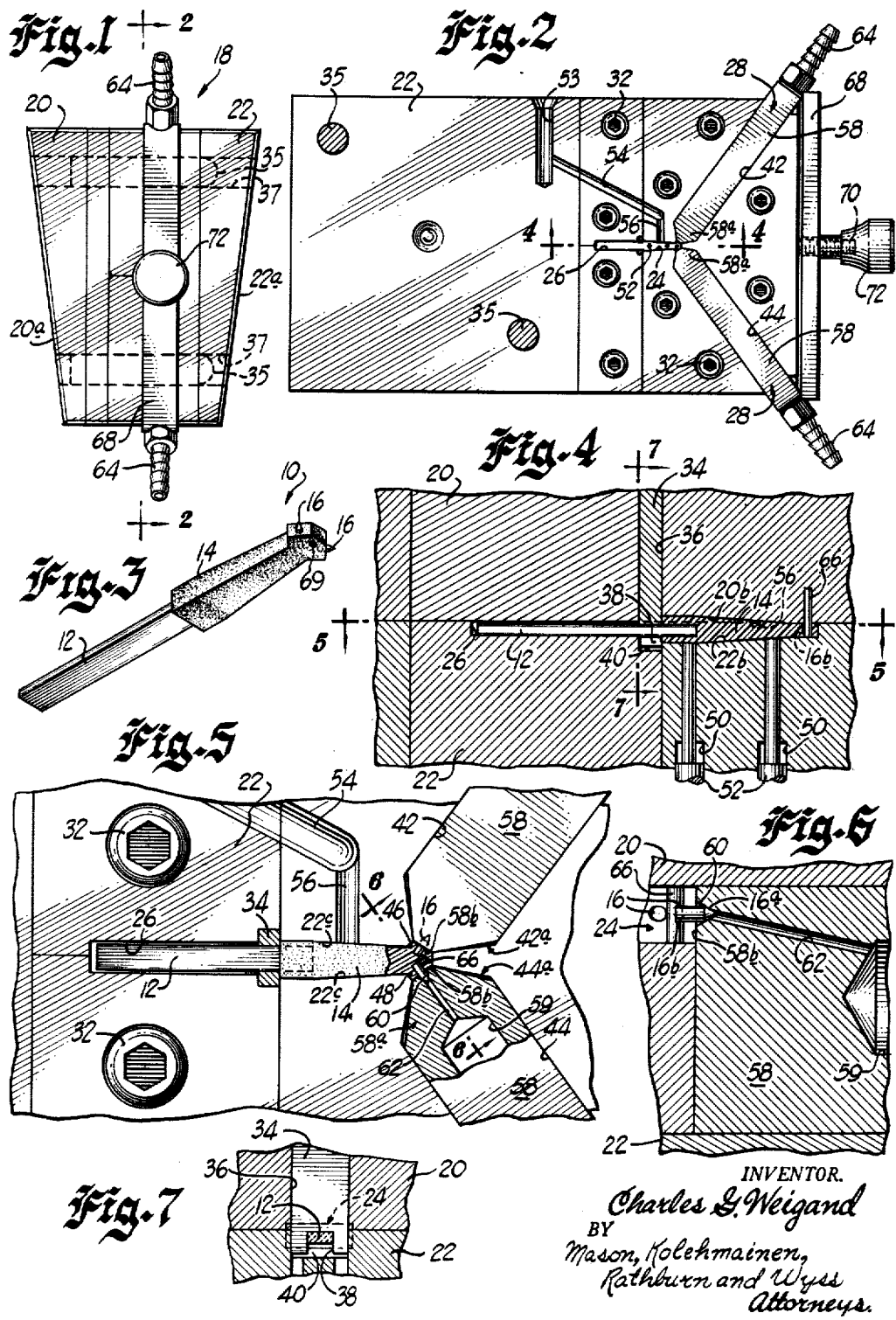
INVENTOR.
Charles G. Weigand
BY
Mason, Kolehmainen,
Rathburn and Wyss
Attorneys.

United States Patent Office 3,089,193
Patented May 14, 1963

3,089,193
APPARATUS FOR AND METHODS OF ASSEMBLING RECORD ENGAGING STYLI
Charles G. Weigand, Glencoe, Ill., assignor to Fidelitone, Incorporated, Chicago, Ill., a corporation of Illinois
Filed July 16, 1958, Ser. No. 748,994
2 Claims. (Cl. 18—36)

This invention relates to a new and improved electromechanical transducer and means for and a method of fabricating this transducer. More specifically, the invention is directed to a novel unitary electromechanical transducer unit that is formed by molding a stylus tip into a transducer coupling element by the use of new and improved assembly means.

In general, electromechanical transducers, such as phonograph pickups, comprise a crystal or transducer element connected to a driving or coupling element which transmits deflecting forces to the transducer element from one or more record engaging styli. Most of these prior devices are assembled by manual operations in which the record engaging tip, which is relatively minute and formed of metal, a sapphire, or a diamond, is either manually positioned on and cemented directly to the driving element or is bonded to a metallic stylus shank and then manually mounted on the driving element by a metal working or a bonding operation. These manual operations are extremely costly and time consuming and do not result in the production of transducer units of uniform quality. Many, if not all, of these disadvantages could be overcome by concurrently molding a unitary transducer assembly including the coupling element, the stylus, and the transducer element or crystal. However, the molding of such a transducer unit presents a number of problems.

These problems arise from the very small size of the record engaging tip and from the composition of the material used to provide this tip. More specifically, the record engaging tip should be of as great a hardness as possible and generally consists of a diamond or sapphire approximately .050 inch long and of varying diameters. Approximately half of this tip, or .020 inch, is formed in a right cylindrical cone having a spherical point for engaging the record grooves and the remainder of the tip is formed as a smooth cylindrical shank. If the tip is to be molded into the coupling or driving element, as by the use of an injection molding process, an adequate bond cannot be produced between the smooth shank of the tip and the plastic material of the coupling element without knurling, notching, or otherwise roughening the surface of the tip. Obviously, this cannot easily be done when the tip is formed of a sapphire or a diamond.

An additional problem arises from the small size of the record engaging tip. In order to provide an adequate bond between the plastic material of the coupling element and the record engaging tip, even when the surface has been knurled, notched, or undercut, it is necessary to embed at least one half of the length of the tip, .025 inch in most cases, in the plastic. This means that only the cone or pointed portion of the tip and an extremely small portion of the cylindrical shank portion is available to be gripped by a work holder when the tip is to be positioned and supported within the mold. This small area which can be gripped does not permit the use of the usual type of work holder. These problems could be overcome by mounting the jeweled tip in a secondary holder which would permit the formation of an adequate bond between the coupling element and the secondary holder and which would permit the tip to be properly located and held within the mold cavity. However, the use of the secondary holder requires additional time consuming manual operations and the provision of different holders for different diameter tips. These factors again increase the cost of the transducer unit.

Accordingly, one object of the present invention is to provide a new and improved electrochemical transducer unit formed by a molding operation.

Another object is to provide a new and improved electromechanical transducer in which one or more stylus elements and a transducer element are concurrently embedded in a mass of thermoplastic material which provides a coupling element between the stylii and the transducer element.

Another object of the present invention is to provide a method of assembling stylus tips of uniform or varying diameters on a coupling element by directly molding these tips into a mass of thermoplastic material.

Another object of the present invention is to provide a new and improved method of assembling electromechanical transducer units in which a transducer element is disposed in one end of a mold cavity, one or more stylus elements are disposed in an opposite end of the cavity, and a thermoplastic material is then injected into the mold cavity to concurrently join the stylus elements of the transducer element.

Another object of this invention is to provide new and improved molding apparatus for forming a complete electromechanical transducer unit by a single molding operation.

Another object is to provide means for assembling an electromechanical transducer unit including a pair of vacuum holders for positioning stylus tips at a proper position within a mold cavity.

A still further object is to provide an apparatus for assembling an electromechanical transducer including a mold defining a mold cavity having a pair of openings through which a pair of stylus elements are inserted into the cavity and an additional opening through which the end of a transducer element is inserted into the cavity so that, by the injection of a plastic material into the mold cavity, a coupling element is provided for joining the stylus elements to the transducer element.

Another object is to provide new and improved holding means for detachably supporting a stylus tip.

A further object is to provide a vacuum holder for detachably supporting stylus tips of varying diameters in a mold cavity to permit the stylus tip to be embedded in a mass of plastic material forming a transducer coupling element.

In accordance with these and many other objects of the present invention, an embodiment thereof comprises a unitary electromechanical transducer unit including a transducer crystal or element having one end thereof embedded in an elongated body of thermoplastic material. To provide a means for driving the transducer element, one or more stylus elements are embedded in the opposite end of the coupling element. To form the transducer unit, a mold is provided defining an elongated mold cavity which, at one end, is in communication with a recess adapted to receive an elongated transducer element. The transducer element is disposed in the recessed portion so that an end of the element extends into the mold cavity. The other end of the mold cavity is provided with a pair of openings for receiving a pair of stylus elements. A pair of vacuum holders each including a passageway having a conically enlarged end are connected to a vacuum line so that the conical tip portions of a pair of stylus elements can be disposed in the enlarged portions of the passageways and held therein by vacuum. The two vacuum holders are then mounted on the mold with the smooth shank portions of the stylus elements extending through the pair of openings.

A thermoplastic material is then injected into the mold cavity and cooled or solidified so that the shrinkage coefficient of the material produces an intimate bond between the thermoplastic material and the smooth shanks of the stylus elements. The solidified thermoplastic material thus forms a force coupling element between the embedded stylus elements and the end of the transducer element which is embedded in the end of the coupling element opposite to the stylus elements. The vacuum holders are removed from the mold assembly, and the mold halves are separated to permit the molded transducer unit to be removed from the mold cavity.

Many other objects and advantages of the present invention will become apparent from the following detailed description thereof when considered in conjunction with the drawing in which:

FIG. 1 is a side elevational view of a mold assembly used in forming the electromechanical transducer unit;

FIG. 2 is a sectional view taken along the lines 2—2 in FIG. 1 showing one of the mold elements;

FIG. 3 is an enlarged perspective view of an electromechanical transducer unit which embodies the present invention;

FIG. 4 is an enlarged sectional view taken along line 4—4 in FIG. 2 assuming that the entire mold assembly is shown therein and that the mold assembly is filled with a thermoplastic material;

FIG. 5 is a sectional view taken along line 5—5 in FIG. 4, assuming that the entire mold assembly is shown therein;

FIG. 6 is an enlarged sectional view taken along line 6—6 of FIG. 5, assuming that the complete mold assembly is shown therein; and FIG. 7 is a sectional view taken along line 7—7 in FIG. 4, again assuming that the complete mold assembly is shown therein.

Referring now more specifically to FIG. 3 of the drawings, therein is shown an electromechanical transducer unit, indicated generally as 10, which is formed by the method of the present invention and by the use of the new and improved assembling apparatus of this invention. In general, the transducer unit 10 comprises a transducer element 12, of a ceramic or crystalline type, having one end embedded in an elongated coupling or driving element 14 formed of thermoplastic material. The other end of the force coupling element 14 supports a pair of generally oppositely extending stylus elements 16 which are directly molded into the coupling element 14 concurrently with the embedding therein of one end of the transducer element 12. Accordingly, when either one of the record engaging stylus elements 16 is placed in engagement with a moving record groove, the excursions of the stylus element 16 are transmitted through the plastic coupling element 14 to deflect the electromechanical transducer 12, thereby to produce an electrical signal varying in accordance with the modulation of the groove.

The stylus elements or tips 16, as indicated above, preferably are formed of a diamond or a sapphire although they can be made of metal. In one particular embodiment that is useful in the present invention, the tip or stylus element 16 includes a pointed portion 16a comprising a right cylindrical cone which is .020 inch in length and a smooth cylindrical shank 16b which is around .030 inch in length.

The transducer unit 10 is produced by a mold assembly, indicated generally as 18, comprising a pair of separable mold elements 20 and 22 which define a mold cavity 24 (FIG. 2) and a recess 26 which is in communication with one end of the mold cavity 24. The transducer element 12 is disposed in the recess 26 with one end thereof projecting into one end of the cavity 24. The mold assembly 18 also includes a pair of identical vacuum holders 28 which detachably mount the stylus elements 16 in the other end of the cavity 24. Thus, when a molding material such as thermoplastic material is injected into the cavity 24 and allowed to cool or solidify, the transducer element 12 and the stylus elements 16 are concurrently embedded in the plastic material, which provides the force coupling element 14, so that the unitary transducer unit 10 is formed by single injection molding operation. Following the solidification of the plastic material forming the coupling element 14, the two halves 20 and 22 of the mold assembly 18 are separated, and the transducer assembly 10 is removed.

Referring now more specifically to the mold assembly 18, this assembly includes the mold elements 20 and 22 which, although designated by single reference numerals, are composed of a plurality of separate elements or plates joined together by a plurality of recessed fasteners 32. By constructing the mold elements 20 and 22 from a plurality of separate pieces, the hobbing operations required to form the various cavities and recesses, such as the mold cavity 24 and the recess 26, are facilitated. The mold elements 20 and 22 are detachably joined together by a pair of guide pins 35 (FIGS. 1 and 2) which are mounted on the mold element 20 and are slidably received with aligned openings 37 (FIG. 1) in the mold element 22. The inner surfaces of the mold elements 20 and 22 are parallel, and the outer surfaces or walls 20a and 22a of the elements 20 and 22 are tapered so that these elements are forced into intimate engagement when the assembly 18 is placed into a mold supporting fixture prior to the molding operation.

To provide the recess 26 for receiving the greater portion of the length of the transducer element 12, the base member 22 is cut away, as indicated in FIG. 4. The upper wall of the recess 26 is formed by the lower surface of the mold element 20. To provide the mold cavity 24, the mold element 22 is recessed to provide a generally upwardly tapered wall portion 22b (FIG. 4) and a pair of generally inwardly tapered wall portions 22c (FIG. 5). The upper wall of the cavity 24 is defined by a generally downwardly extending wall surface 20b (FIG. 4) on the mold element 20. Accordingly, the mold cavity 24 is of a generally tapered configuration. Obviously, the mold assembly 18 can be provided with a plurality of cavities 24 so that a number of transducer units 10 can be produced by a single molding operation.

As indicated above, one end of the transducer element 12 extends from the recess 26 into one end of the mold cavity 24. In order to prevent the flow of plastic material from the mold cavity 24 rearwardly into the recess 26, a gate element 34 is provided which is slidably mounted in a slot 36 formed in the mold element 20 at a position located between the recess 26 and the cavity 24. The lower end of the gate element 34 is bifurcated to provide a notch or slot 38 within which the transducer element 12 is received. Thus, when the two mold elements 20 and 22 are moved into mating juxtaposition, the lower end of the gate element 34 centers the transducer element 12 in the notch 38 (FIG. 7) and engages this element on three sides to effectively prevent the flow of plastic material rearwardly from the mold cavity 24 into the recess 26. To facilitate this, the lower end of the gate element 34 is received within a depression 40 (FIG. 7) formed in the mold element 22.

To provide means for permitting the stylus elements 16 to be inserted into the mold cavity 24, the mold element 22 is provided with a pair of generally opposite and diagonally extending slots 42 and 44 (FIG. 5) adapted to slidably receive the vacuum holder assemblies 28. The inner ends of the recesses or slots 42 and 44 are tapered, as indicated at 42a and 44a, and are placed in communication with the interior of the mold cavity 24 through a pair of openings 46 and 48.

The mold assembly 18 also includes means for removing the completed transducer unit 10 from the mold cavity 24. The mold element 22 is provided with a pair of shouldered openings 50 which extend through the mold element 22 to the mold cavity 24. A pair of shouldered knockout pins 52, the upper ends of which form a portion of the lower wall surface 22b of the mold cavity 24, are slidably disposed in the openings 50 with the shoulders on the pins 52 spaced slightly from the shoulders in the openings. Thus, when the mold elements 20 and 22 are separated, the knockout pins 52 are actuated by conventional means to move vertically upward (FIG. 4) to displace the transducer assembly 10 from the mold cavity 24 and the recess 26.

In order to provide means for supplying a thermoplastic molding composition or material to the mold cavity 24, the mold elements 20 and 22 are provided with mating recessed portions defining a plurality of connected passageways 53, 54 and 56. The outer end of the passageway 53 preferably is chamfered to allow for a possible misalignment between the passageway 53 and a coupling member connected to the cylinder of the injection molding apparatus. The inner end of the passageway 56 opens into the mold cavity 24 at a position disposed substantially midway along the length thereof.

Referring now more specifically to the vacuum holders 28, which are identical in construction, these holders each include a generally rectangular member 58 having an axial bore 59 extending from one end of the member 58 substantially to the other end thereof. This other end of the member 58 is provided with a generally right conical recess or depression 60 which is placed in fluid communication with the bore 59 through a downwardly and inwardly extending passageway 62. The angle between the axis of the conical recess 60 and the generatrix thereof is substantially identical to the similar angle of the right conical tip 16a of the stylus element 16. Thus, tips of different diameters are properly supported on the holders 28. The other end of the member 58 carries a nipple 64 which is adapted to be connected to a vacuum line.

Accordingly, when a stylus element 16 is to be mounted on the holder 28, the vacuum line connected to the nipple 64 produces a flow of air from the atmosphere through the restricted passageway 62 into the bore 58. Thus, when this end of the assembly 28 is moved into juxtaposition to the pointed tip 16a of a stylus element 16, the conical tip 16a moves into and is held in intimate engagement with the conical enlarged portion 60, thereby to be mounted on the element 58 so that the smooth shank portion 16b thereof projects outwardly substantially perpendicular to the end surface of the member 58. The vacuum holder 28 is then placed in the groove 44 and moved inwardly toward the mold cavity 24 until such time as a tapered end portion 58a on this member engages the tapered portion 44a. In this position, the smooth shank 16b of the stylus element 16 is disposed within the mold cavity 24 and a flat end wall 58b of the member 58 defines a portion of the side wall of the mold cavity 24. Similarly, when another stylus element 16 has been picked up and mounted on the other vacuum holder 28, this holder is placed in the slot 42 and advanced until the tapered end 58a of the member 58 moves into engagement with the tapered end 42a of the slot 42. In this position, the smooth cylindrical shank 16b of the other sylus element 16 is disposed within the mold cavity 24, and a portion of the side wall of this cavity is defined by a vertically extending flat wall 58b on the member 58.

In order to prevent any deflection of the stylus elements 16 carried by the holder assemblies 28 from their proper positions due to the force of the plastic material injected into the mold cavity 24, the mold element 20 can be provided with a pin 66 which extends into the mold cavity 24 to be engaged by the outer edges of the shanks 16b of the stylus elements 16. Thus, when the molding composition is injected into the mold cavity 24, the shanks 16b of the stylus elements 16 bear against the pin 66 and are not displaced. If the pin 66 is provided, the transducer unit 10 includes an aperture 69 (FIG. 3).

To provide means for detachably securing the vacuum holder assemblies 28 to the mold assembly 18, a latching bar 68 is provided which is centrally apertured to receive an externally threaded element 70 carried on the mold element 22. When the holder assemblies 28 are assembled within the slots 42 and 44 on the element 22, the opposite ends of the latching bar 68 are moved into engagement with the outer ends of the members 58, and a thumb screw 72, which is mounted on the threaded element 70, is tightened to force the members 58 into engagement with the mold element 22. This prevents the inadvertent displacement of the holder assemblies 28 and, accordingly, of the stylus elements 16.

In performing the method of the present invention, the two mold elements 20 and 22 of the assembly 18 are separated and a transducer element 12 is disposed in the recess 26 with one end thereof projecting into the mold cavity 24. The two holder assemblies 28 are then placed adjacent a pair of stylus elements 16 so that the vacuum in the passageways 62 and the bores 59 causes the conical tips 16a thereof to be seated in the conical depressions or enlarged portions 60 in the ends of the members 58. The tips 16 are secured in position by atmospheric pressure with the smooth cylindrical shank portions 16b projecting perpendicularly outward from the end walls 58b of the members 58. The members 58 are then slidably mounted in the slots 42 and 44 and advanced until the tapered portions 58a engage the tapered portions 42a and 44a. In this position, the flat end walls 58b define a portion of the inner wall of the mold cavity 24, and the shank portions 16b project inwardly into the mold cavity through the openings 46 and 48. If a pin 66 is provided, the shank portions 16b bear against the pin 66 to prevent lateral displacement of the stylus elements 16 during the molding operation. The latching bar 68 is then moved into engagement with the outer ends of the members 58, and the thumbscrew 72 is tightened to clamp the vacuum holder assemblies 28 in an adjusted position on the mold element 22.

The other mold element 20 is then assembled on the mold element 22 by inserting the pins 35 into the openings 37. The mold assembly 18 is inserted into a suitable holder and forced downwardly therein so that the tapered walls 20a and 22a force the mold elements 20 and 22 into intimate engagement. This completes the preparation of the mold assembly 18 for receiving the molding material.

A thermoplastic material is then forced under pressure through the passageways 53, 54 and 56 into the mold cavity 24. This material flows around the projecting end of the transducer element 12 and also around the shank portions 16b of the stylus elements 16 and the pin 66, if provided. The gate 34 prevents the mass of thermoplastic material from entering the recess 26. After the thermoplastic material has cooled or solidified, the shrinkage coefficient thereof causes a tight bond to be formed between the smooth shanks of the stylus elements 16 and the mass of material forming the coupling element 14. Similarly, this shrinkage causes the formation of a tight bond between the projecting end of the transducer element 12 and the coupling element 14. If the element 12 is not to be joined to the coupling element 14 during the injection molding operations, the mold elements 20 and 22 can be formed with means extending into the cavity 24 in place of the projecting end of the element 12. This causes the formation of an axial opening in the end of the coupling element 14 into which one end of the element 12 can subsequently be inserted.

The thumb screw 72 is then loosened to permit the latching bar 68 to be displaced and the vacuum holders 28 are removed from the mold assembly 18. This assembly is then removed from its holder, and the mold elements 20 and 22 are separated. The knockout pins 52 are actuated by suitable means to move upwardly and displace the molded transducer unit 10 from the mold cavity 24 and the recess 26. Following its ejection, the pouring spout and any other flashing which may be connected to the body of the coupling element 14 is removed. Accordingly, the novel transducer unit 10 of the present invention is fabricated by a single injection molding operation by the use of the new and improved assembly means and method of this invention.

In one specific embodiment of this invention that has been found to be particularly useful, the thermoplastic material comprises a polymer of styrene, such as the highly thermoplastic resin "Styron" which is distributed by Dow Chemical Co. The "Styron" resin, which has a softening point of from 220–240° F., is heated in a cylinder forming a part of the injection molding apparatus to a temperature of around 550° F. and supplied to the mold cavity at a pressure of around eight pounds per square inch. When the "Styron" resin is cooled, a firm bond is provided between the coupling element 14 and the smooth shanks 16b of the record engaging tips 16.

Although the present invention has been described in conjunction with only a single embodiment thereof, it is obvious that many other modifications and embodiments may be provided by those skilled in the art which will fall within the spirit and scope of the principles of this invention.

What is claimed and desired to be secured by Letters Patent of the United States is:

1. An apparatus for making a transducer unit having a stylus element with a pointed tip comprising a mold defining a mold cavity and an opening in communication with said mold cavity, an elongated and manipulable stylus holding means, said stylus holding means including a wall portion defining a part of the mold cavity and a passageway connected to a stylus receiving portion in the wall portion, said stylus holding means being removably mounted in said opening with said stylus receiving portion disposed adjacent said mold cavity, and a flexible vacuum line connected to said passageway to detachably hold the stylus on said stylus holding means in said stylus receiving portion to permit a stylus element to be mounted on said stylus holding means and then supported in said mold cavity by mounting said stylus holding means in said opening in said mold.

2. A method of making a transducer unit having a stylus element which comprises moving a stylus holding element connected to vacuum in proximity to a stylus element so that the vacuum detachably mounts the stylus element on the stylus holding element, moving the stylus holding element in proximity to a mold, inserting the stylus holding element into the mold to position the stylus element in a mold cavity with a wall portion on the holding element defining a part of the cavity, molding a mass of molding material about the stylus element, and removing the stylus holding element and the mass of molding material with the stylus element remaining in the mass of molding material.

References Cited in the file of this patent

UNITED STATES PATENTS

| | | |
|---|---|---|
| Re. 20,193 | Swarovski | Dec. 8, 1936 |
| 2,094,823 | Sample et al. | Oct. 5, 1937 |
| 2,356,585 | Hempel | Aug. 22, 1944 |
| 2,390,821 | Willcox | Dec. 11, 1945 |
| 2,459,543 | Schmerheim | Jan. 18, 1949 |
| 2,473,374 | Hutter | June 14, 1949 |
| 2,531,067 | Massa | Nov. 21, 1950 |
| 2,557,350 | Hutter | June 19, 1951 |
| 2,580,668 | Franz | Jan. 1, 1952 |
| 2,625,401 | Frederick | Jan. 13, 1953 |
| 2,658,238 | Rizzo | Nov. 10, 1953 |
| 2,683,287 | Cochran et al. | July 13, 1954 |
| 2,689,738 | Jensen | Sept. 21, 1954 |
| 2,724,862 | Merrill et al. | Nov. 29, 1955 |
| 2,742,295 | Frederick | Apr. 17, 1956 |

OTHER REFERENCES

Noftsinger, 697,592, Apr. 3, 1951.

UNITED STATES PATENT OFFICE
CERTIFICATE OF CORRECTION

Patent No. 3,089,193                              May 14, 1963

Charles G. Weigand

It is hereby certified that error appears in the above numbered patent requiring correction and that the said Letters Patent should read as corrected below.

Column 2, line 22, for "of the" read -- to the --; column 5, line 59, for "sylus" read -- stylus --; column 7, line 13, for "eight" read -- eighty --.

Signed and sealed this 3rd day of December 1963.

(SEAL)
Attest:
ERNEST W. SWIDER

Attesting Officer

EDWIN L. REYNOLDS

Acting Commissioner of Patents